March 9, 1965  A. R. BARRINGER  3,173,081
ATOMIC PRECESSION MAGNETOMETER
Filed Nov. 22, 1960  3 Sheets-Sheet 1

Inventor
ANTHONY RENÉ BARRINGER by: *Cavanagh & Norman*

March 9, 1965  A. R. BARRINGER  3,173,081
ATOMIC PRECESSION MAGNETOMETER
Filed Nov. 22, 1960  3 Sheets-Sheet 2

Inventor
ANTHONY RENÉ BARRINGER by: *Cavanagh & Norman*

March 9, 1965  A. R. BARRINGER  3,173,081
ATOMIC PRECESSION MAGNETOMETER
Filed Nov. 22, 1960  3 Sheets-Sheet 3
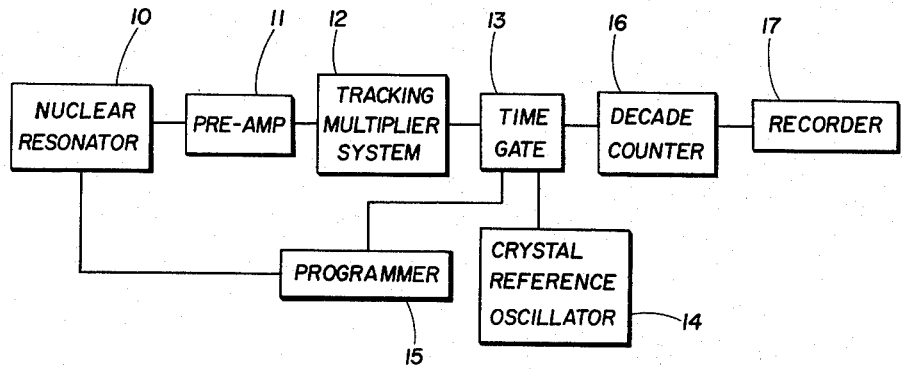
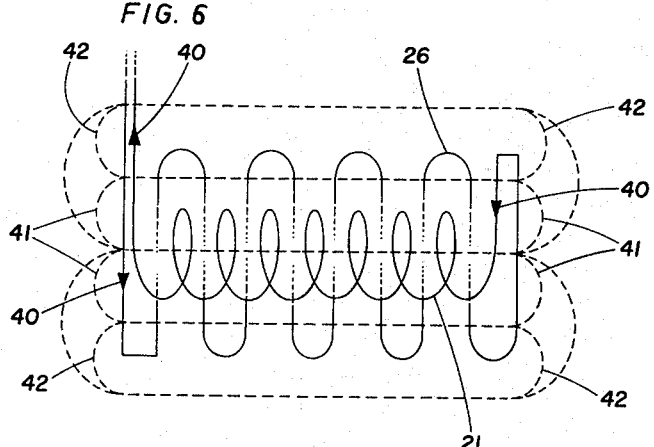
FIG. 6
FIG. 7
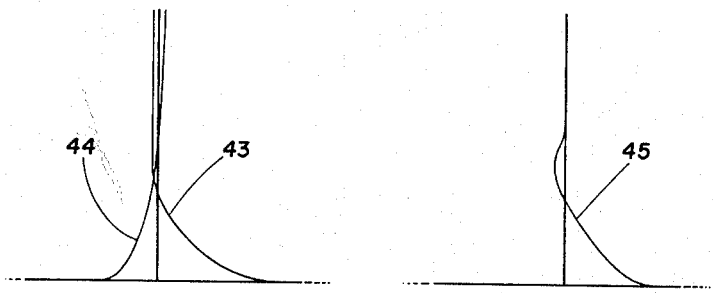
FIG. 8A  FIG. 8B
Inventor
ANTHONY RENÉ BARRINGER
by: Cavanagh & Norman

United States Patent Office 3,173,081
Patented Mar. 9, 1965

3,173,081
ATOMIC PRECESSION MAGNETOMETER
Anthony René Barringer, Agincourt, Ontario, Canada, assignor to Barringer Research Limited
Filed Nov. 22, 1960, Ser. No. 71,021
11 Claims. (Cl. 324—.5)

The invention relates to an atomic precession magnetometer and is of particular interest in association with magnetometers of the type used in aerial prospecting operations.

An atomic precession magnetometer consists essentially of a sensing head in which the atomic nuclei, in a sample of water or light hydro carbon, are polarized by a strong magnetic field, after which the polarizing field is abruptly terminated allowing the nuclei to precess freely about the earth's magnetic field. Such precession occurs according to certain, now well established, laws which are briefly summarized by Milton B. Dobrin in Introduction to Geophysical Prospecting Second edition (McGraw-Hill Book Co. 1960) at pages 286–290.

The amplitude of precession is at a maximum immediately after the decay of the strong polarizing field and decreases rapidly until precession disappears when the nuclei stabilize under the influence of the earth's magnetic field. The frequency of such precession is constant throughout this period, however, and is directly related to the strength of the earth's magnetic field according to the equation $$W = Y_p H$$

where $Y_p$ is the gyromagnetic ratio of the nuclei which is constant and H is the earth's magnetic field, the resultant frequency W being referred to as the Larmor frequency. The measurement of this frequency thus affords an accurate and sensitive measurement of the earth's magnetic field, or indeed, any stable, ambient magnetic field which it is sought to measure.

In an elementary form of this type of magnetometer, the sample of water is contained in a bottle, and the polarizing field is provided by a coil wound around the bottle and connected to a suitable source of power. Switch gear is provided for abruptly terminating the field after which the momentary precession of the nuclei induces a weak, alternating current in the coil, the frequency of which is proportional to the earth's magnetic field, and this frequency is measured over a brief period by suitable instrumentation to give the information desired.

However, while such a magnetometer is a relatively sensitive instrument in many cases, it is inherently subject to external electro-magnetic interference, the nuclear precession signal being extremely weak, and the accuracy of measurement of such a signal being severely degraded by external interfering fields and similar electrical "noise."

Accordingly, it has been proposed to cancel such external interfering fields by the provision of two such sensing heads coupled to work in opposition to one another, that is to say, in which the strong polarizing fields polarize the water samples in opposite directions. Canadian Patent No. 591,019, Anderson et al., assignors to Varian Associates, describes one such improved nuclear precession magnetometer in which identical coils are used, connected in series bucking manner, and placed end to end or side by side with one another.

This development has the advantage that while the effect of the external electro-magnetic fields in the opposed coils is self-cancelling, the precession signal caused by the precessing nuclei is additive, thus strengthening the total signal and reducing the interference.

However, these expedients are unsuitable for use in aerial prospecting operations and other situations where a high degree of mobility is required, and in particular, where the sensing head as a whole is in motion in relation to the external interfering magnetic fields.

This situation may occur in a variety of ways for example where the operation of the aircraft itself creates some such external interfering electromagnetic fields, or where other electromagnetic geophysical prospecting apparatus is operated from the same aircraft for obtaining further information.

When such relative movement occurs the effect of the external electromagnetic fields on the two opposed coils will not be self-cancelling since the relative position of the two coils will change in relation to the external electromagnetic field thus giving rise to differences in the voltages induced therein and leading once more to the occurrence of interference or electrical "noise" with consequent degradation of the precession signal.

Accordingly, it is an objective of this invention to provide an atomic precession magnetometer which can be operated in proximity to electromagnetic interference with a high degree of mobility and with a minimum of resultant interference and noise accruing therefrom.

More specifically it is an object of the invention to provide a magnetometer having the foregoing advantages in which the precession signal is enhanced.

More specifically it is an object of the invention to provide a magnetometer having the foregoing advantages in which noise signals induced by exterior electromagnetic interference are substantially eliminated by self-cancellation in substantially all orientations of said magnetometer.

The invention seeks to achieve the foregoing and other objectives which will appear from the following descriptions of a preferred embodiment by the provision in a magnetometer head of the precessing atom portion type in which atomic portions in a liquid sample are polarized by an inducted electromagnetic field which is thereafter abruptly terminated permitting said atomic portion to precess freely about the magnetic field to be assessed and the precession frequency measured to determine the field strength thereof, the combination of, pick-up means for detecting electromagnetic impulses set up by said precession and converting them into an electrical signal; and screening means associated with said pick-up means for minimizing interference induced therein by electromagnetic impulses originating independently of said precession.

A preferred embodiment of the invention will now be described with reference to the following drawings in which like reference devices refer to like parts thereof throughout the various views and diagrams and in which;

FIGURE 6 is a schematic block diagram showing the general constituent members of the remainder of the magnetometer according to the invention; and FIGURE 7 is a schematic diagram of the sensing head according to the invention showing the magnetic fields established therein during polarization; and FIGURES 8A and 8B represent the trend curves of the magnetic fields indicated in FIGURE 7.

Figure 1:
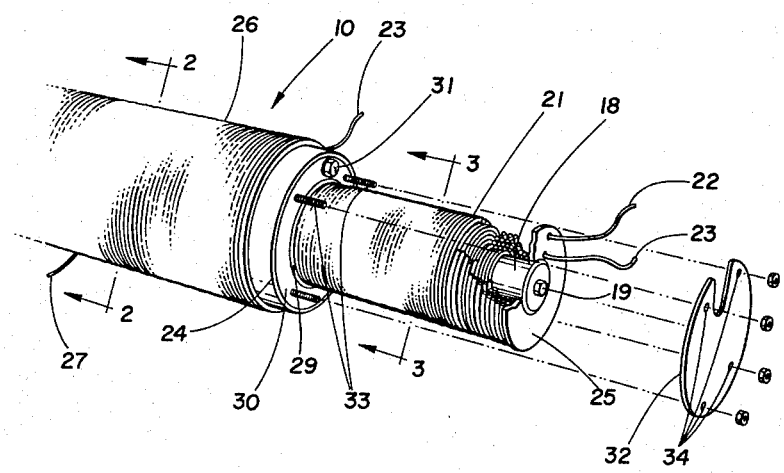
FIGURE 1 is a perspective view of a sensing head for a magnetometer according to the invention partially exploded and cut away to reveal the interior thereof.

Before discussing the specific features of the magnetometer sensing head of this embodiment a brief reference will be made to the various other components of the magnetometer, and the circuitry associated therewith, as shown generally in FIGURE 6. Thus, FIGURE 6 shows the magnetometer sensing head generally referred to as the nuclear resonator 10 from which the precession signal is passed through pre-amplifier 11 to the tracking multiplier system 12. The multiplied signal is then passed to the time gate 13 which serves to sample the multiplied signal for a specific period of time. The duration of sampling by time gate 13 is controlled by crystal reference oscillator 14 utilizing conventional techniques. A programmer 15 is arranged to trigger the opening of time gate 13 in order to provide any predetermnied number of readings per minute, and is also arranged to sequentially activate the nuclear resonator 10 and trigger time gate 13 upon removal of the polarizing current. The signal portion sampled by time gate 13 is fed to a decade counter 16 and the counter output is in turn fed to a suitable recorder 17.

The foregoing is merely a summary of the general functions of these members which are more specifically described in the co-pending application Serial Number 793,788, now issued to Patent No. 3,098,197, entitled Method and Apparatus For The Measurement of Magnetic Fields.

Figure 2:
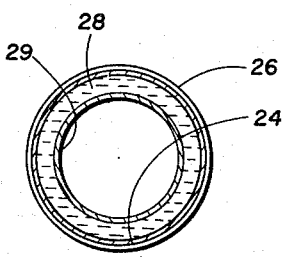
FIGURE 2 is a section along the line 2—2 of FIGURE 1.
Figure 3:
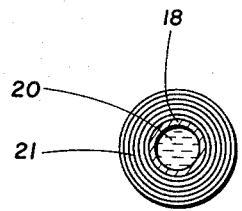
FIGURE 3 is a section along the line 3—3 of FIGURE 1.

Attention is now directed to FIGURES 1, 2 and 3 illustrating the construction of the magnetometer sensing head or resonator 10 and it will be seen to comprise inner container 18 of generally cylindrical shape having a filler plug 19 at one end thereof for filling container 18 with the liquid sample 20.

Coil 21 is wound around container 18 along substantially the entire length thereof and is provided with sufficient turns area to establish a polarizing field of substantial density, in the region of 100 gauss, within container 18. One end of coil 21 is connected by wire 22 to the associated measuring circuit, described above, and the other end by wire 23 to the screening means to be described hereinafter.

Former 24 is provided around the exterior of coil 21 and spaced a substantial distance therefrom, the ratio of their respective diameters being approximately from 2:1 to 3:1 or even more. Endplates 25—25 are located at either end of container 18 to which they are attached around their inner peripheries for supporting the same co-axially with former 24.

Screening means in the form of coil 26 is wound around former 24 and connected at one end thereof by wire 23 to coil 21 and at the other end thereof to the associated measuring circuit described above, by wire 27.

Coil 26 is designed to embody substantially the same turns area as coil 21, whereby to ensure that any external electromagnetic impulses induce identical signals in both said coils. Furthermore, coils 21 and 26 are connected together in series-bucking manner thus providing for cancellation of one said induced signal by the other. It is emphasized the design of coil 26 and its location spaced substantially from coil 21 is of importance in achieving clarity of the precession signal and in particular that the positioning of the coils on coincident axes renders induced interference signals self-cancelling even where such interference impulses originate from a nearby source and sensing head 10 is in motion.

In one example of a satisfactory design, coil 21 embodies 950 turns of 14 gauge wire with an inner diameter of 1.5 inches, and coil 26 embodies about 300 turns of 14 gauge wire with an inner diameter of 4.5 inches.

While it may not always be desirable, it has been found advantageous in this preferred embodiment of the invention to provide a further liquid sample 28 located between coil 21 and coil 26, being contained within former 24 and interfitting tube 29, of reduced diameter in relation thereto, attached to one another by annular end walls 30. Filler plug 31 is provided for filling the composite container with liquid 28.

Discs 32 are provided at opposite ends of the sensing head 10 for fastening inner container 18 within interfitting tube 29, bolts 33 extending from end walls 30, 30 and passing through holes 34 in discs 32 as shown, thus maintaining coils 21 and 26 and their associated liquid samples at 28 in their aforementioned relationship fitting one within the other and aligned on identical axes.

Figure 4:
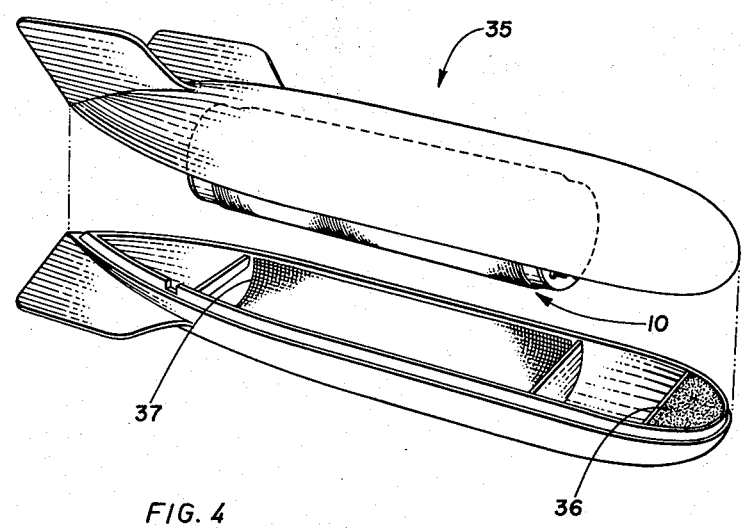
FIGURE 4 is a perspective view of the container or "bird" in which the magnetometer sensing head of FIGURE 1 is carried in operation.

In FIGURE 4, 35 designates a container or "bird" for carrying the magnetometer during operation. The container is towed behind an aircraft and the bird shown in FIGURE 4 carries the magnetometer in such a way that the horizontal axis of the magnetometer is parallel to the ground and the axis is towed in a direction parallel to the direction of flight of the aircraft. The nose of the bird is filled with lead 36. A mesh of electrostatic shielding 37 surrounds the magnetometer in the bird.

Figure 5:
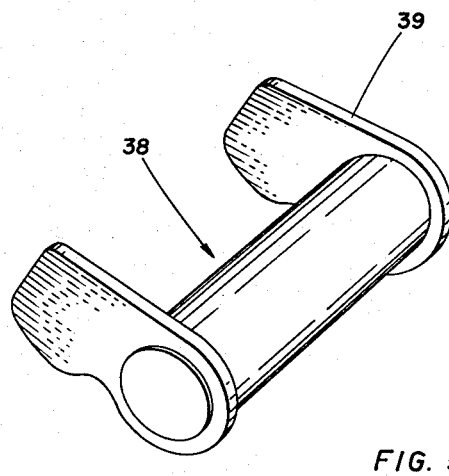
FIGURE 5 is a perspective view of an alternative "bird"

FIGURE 5 shows an alternative type bird 38 for carrying the magnetometer with the magnetometer axis oriented differently. The axis of the magnetometer is again horizontal to the ground but in the bird of FIGURE 5 the axis is now perpendicular to the path of the direction of the aircraft. Two stabilizers 39 are positioned on each end of the bird to help maintain the bird in a stable line of flight.

In operation the sensing head or resonator 10 is mounted as a suitable "bird" and towed some distance behind an aircraft, the associated measuring circuitry being located in such aircraft for convenience. It will be understood that the "bird" will be subject to a certain degree of fluctuation in flight causing it to twist or veer in its course and in relation to the aircraft. At the same time the sensing head 10, being in relatively close proximity to the aircraft, will be subjected to interfering electromagnetic waves emanating therefrom and having substantial gradient characteristics, such interference being minimized or virtually eliminated in the manner to be described.

Thus, in order to measuure the earth's magnetic field along the line of flight of the aircraft, current is applied to coils 21 and 26 from any suitable source such as a 12 volt battery (not shown) for a period sufficient to permit the polarization of liquid samples 20 and 28.

It will be understood that while the polarizing field of coil 21 in the region of liquid sample 20 is opposed by the polarizing field of coil 26 such opposition is minimized by the spacing separating them. Conversely, the polarization of liquid sample 28 is in fact enhanced, the fields of coils 21 and 26 both co-operating in this region. Reference may be made to FIGURE 7 at this point wherein the arrows 40 represent the direction of the polarizing current and broken lines 41 represent the magnetic field of coil 21 and lines 42 represent the magnetic field of coil 26.

Conversely, the magnetic fields of respective coils 21 and 26 exteriorly of sensing head 10 will be opposed to one another and will in fact diminish rapidly to a negligible value a short distance therefrom, a characteristic which permits the use of the two sensing heads adjacent to one another operating sequentially without mutual interference so that by suitable switching means a continuous precession signal can be obtained.

FIGURE 8A shows the general trend curves of this effect with curve 43 representing the magnetic field of coil 21 and curve 44 representing the field of coil 26.

FIGURE 8B represents the combined effect of both magnetic fields as curve 45, diminishing rapidly to a value appproaching zero.

This brief discussion of the respective magnetic fields created does not deal with all the complexities involved but it is noteworthy that the combined magnetic fields emanating from sensing head 10 during operation are in fact confined to the immediate vicinity thereof thus reducing interference effects on other equipment which may be advantageous in some circumstances.

After a suitable period, about 0.3 second having been found to give good results, the current is abruptly terminated under the control of programmer 15 thus permitting free precession of the atomic nuclei of liquid samples 20 and 28 under the influence of the earth's magnetic field. Such free precession will induce a weak alternating current both in coil 21 and coil 26, the currents being additive and providing a composite precession signal for measurement. Simultaneously programmer 15 opens time gate 13 to permit measurement of the precession frequency over a precise duration of time by decade counter 16 and recorder 17.

After completion of one such measurement the sequence of events is repeated at suitable intervals one half second intervals having been found to give good results. During this period, interfering electromagnetic waves originating from the aircraft will induce "noise" signals of greater or lesser strength in coils 21 and 26 but it will be observed that such signals will cancel one another, coils 21 and 26 being connected in series-bucking manner and being of substantially equal turns area and having coincident axes.

Furthermore, the movement of the "bird" and sensing head 10 relative to such interfering electromagnetic waves will not impair the degree of noise signal cancellation, coils 21 and 26 being located one within the other on the same axis and hence not being affected by such movement.

A still further result of the noise signal cancellation effected by coils 21 and 26 is the opportunity of mounting sensing head 10 either along the axis of flight, in "bird" 35 or transversely thereto, in "bird" 38, either of which arrangements may offer particular advantages in special circumstances.

Having now described this preferred embodiment of the invention in detail it will be understood that it is not to be considered as confined merely to airborne operations but will be of utility in many other circumstances, particularly where mobility is essential.

Various modifications may suggest themselves to persons skilled in the art and thus, for example, liquid sample 28 may be dispensed with if desired, coil 26 merely functioning as an inductive screen for coil 21 and the precession signal being induced solely by the atomic nuclei in liquid sample 20. The precession signal in such an alternative form of the invention is naturally somewhat weaker but will usually provide an adequate signal for purposes of measurement.

While there has been described what is at present considered to be a preferred embodiment of the present invention, it will be appreciated by those skilled in the art that various changes and modifications can be made therein without departing from the essence of the invention and it is intended to cover herein all such changes and modifications as come within the true spirit and scope of the appended claims.

What I claim is:

1. A magnetometer sensing head of the precessing atom portion type in which the precession frequency of such portions is measured to assess the strength of the field under examination and comprising: at least one liquid sample embodying said atom portions; a container for said liquid sample; pick up coil means extending around said container for inducing an electromagnetic field therein and polarizing said atom portions and for thereafter picking up electromagnetic impulses set up by said precession and convert the same into an electrical signal; means for connecting said coil to a source of electrical supply and for thereafter abruptly terminating the electromagnetic field induced thereby; and a screening coil extending around said coil means encompassing the same along its length with the axes of both coils being concident, said coil means and said screening coil being connected in series bucking relation relative to exterior electromagnetic impulses originating independently of said procession and in circuit with said electrical supply said screening coil being dimensioned to define a substantially regular spacing between itself and said pick up coil to minimize opposition to the polarising electromagnetic field of said coil means in the region of said liquid sample.

2. In a magnetometer head of the precession atom protion type in which atomic portions in a liquid sample are polarized by an induced electromagnetic field which is thereafter abruptly terminated permitting said atomic portions to process freely about the magnetic field to be assessed and the precession frequency measured to determine the field strength thereof, the combination of inductive pick up means including a pick up coil located around said liquid sample for detecting electromagnetic impulses set up by said precession and converting them into an electrical signal; and, inductive screening means including a screening coil extending around said pick up coil encompassing the same along its length with the axes of both coils being coincident, connected to said pick up coil in series bucking relation relative to exterior electromagnetic impulses originating independently of said precession, said screening coil being dimensioned to define a substantially regular spacing between itself and said pick up coil.

3. In a magnetometer head of the precessing atom portion type in which atomic portions in a liquid sample are polarized by an induced electromagnetic field which is thereafter abruptly terminated permitting said atomic portions to precess freely about the magnetic field to be assessed and the precession frequency measured to determine the field strength thereof, the combination of inductive pick up means including a pick up coil located around said liquid sample for detecting electromagnetic impulses set up by said precession and converting them into an electrical signal; inductive screening means including a screening coil extending around said pick-up coil encompassing the same along its length with the axes of both coils being coincident, connected to said pick-up coil in series bucking relation relative to exterior electromagnetic impulses originating independently of said precession, said screening coil being dimensioned to define a substantial cylindrical spacing between itself and said pick-up coil and of equal turns area therewith to ensure substantial cancellation of signals induced by said exterior electromagnetic impulses; means connecting said pick-up coil to a source of electrical supply establishing an induced electromagnetic field; and, switchgear for abruptly interrupting said electrical supply and collapsing said induced field.

4. In a magnetometer head of the precessing atom portion type in which atomic portions in a liquid sample are polarized by an induced electromagnetic field which is thereafter abruptly terminated permitting said atomic portions to precess freely about the magnetic field to be assessed and the precision frequency measured to determine the field strength thereof, the combination of inductive pick-up means including a pick-up coil located around said liquid sample for detecting electromagnetic impulses set up by said precession and converting them into an electrical signal; inductive screening means including a screening coil extending around said pick-up coil encompassing the same along its length with the axes of both coils being coincident, connected to said pick-up coil in series bucking relation relative to exterior electromagnetic impulses originating independently of said precession, said screening coil being dimensioned to define a substantial cylindrical spacing between itself and said pick-up coil and of equal turns area therewith to ensure substantial cancellation of signals induced by said exterior electromagnetic impulses; precession frequency measuring apparatus connectible to said pick-up means and said screening coil; and, switchgear operable to connect said measuring apparatus on the termination of said inducted electromagnetic field.

5. In a magnetometer head of the precessing atom portion type in which atomic portions in a liquid sample are polarized by an induced electromagnetic field which is thereafter abruptly terminated permitting said atomic portions to precess freely about the magnetic field to be assessed and the precession frequency measured to determine the field strength thereof, the combination of inductive pick up means including a pick up coil located around said liquid sample for detecting electromagnetic impulses set up by said precession and converting them into an electrical signal; inductive screening means including a screening coil extending around said pick up coil encompassing the same along its length with the axes of both coils being coincident, connected to said pick up coil in series bucking relation relative to exterior electromagnetic impulses originating independently of said precession, said screening coil being dimensioned to define a substantially regular spacing between itself and said pick up coil said pick up and screening coils being of substantially the same turns area to ensure substantial cancellation of noise signals generated therein by said exterior magnetic impulses and means fastening said pick up coil and said screening coil in said spaced relation.

6. In a magnetometer head of the precessing atom portion type in which atomic portions in a liquid sample are polarized by an induced electromagnetic field which is thereafter abruptly terminated permitting said atomic portions to precess freely about the magnetic field to be assessed and the precession frequency measured to determine the field strength thereof, the combination of inductive pick up means including a pick up coil located around said liquid sample for detecting electromagnetic impulses set up by said precession and converting them into an electrical signal; inductive screening means including a screening coil extending around said pick up coil encompassing the same along its length with the axes of both coils being coincident, connected to said pick up coil in series bucking relation relative to exterior electromagnetic impulses originating independently of said precession, said screening coil being dimensioned to define a substantial cylindrical spacing between itself and said pick-up coil a second said liquid sample located between said pick-up coil and said screening coil and means fastening said pick up coil and said screening coil in said spaced relation with said second liquid sample therebetween.

7. In a magnetometer head of the precessing atom portion type in which atomic portions in a liquid sample are polarized by an induced electromagnetic field which is thereafter abruptly terminated permitting said atomic portions to precess freely about the magnetic field to be assessed and the precession frequency measured to determine the field strength thereof, the combination of inductive pick-up means including a pick-up coil located around said liquid sample for detecting electromagnetic impulses set up by said precession and converting them into an electrical signal; inductive screening means including a screening coil extending around said pick-up coil encompassing the same along its length with the axes of both coils being coincident, connected to said pick-up coil in series bucking relation relative to exterior electromagnetic impulses originating independently of said precession, said screening coil being dimensioned to define a substantial cylindrical spacing between itself and said pick-up coil; said pick-up and screening coils being of substantially the same turns area to ensure substantial cancellation of noise signals generated therein by said exterior electromagnetic impulses; a second said liquid sample located between said pick-up coil and said screening coil and means fastening said pick up coil and said screening coil in said spaced relation with said second liquid sample therebetween.

8. In a magnetometer head of the precession atom portion type in which atomic portions in a liquid sample are polarized by an induced electromagnetic field which is thereafter abruptly terminated permitting said atomic portions to precess freely about the magnetic field to be assessed and the precession frequency measured to determine the field strength thereof, the combination of inductive pick up means including a pick up coil located around said liquid sample for detecting electromagnetic impulses set up by said precession and converting them into an electrical signal; inductive screening means including a screening coil extending around said pick up coil encompassing the same along its length with the axes of both coils being coincident, connected to said pick up coil in series bucking relation relative to exterior electromagnetic impulses originating independently of said precession, said screening coil being dimensioned to define a substantially regular spacing between itself and said pick up coil; means connecting said pick up coil and said screening coil to a source of electrical supply establishing an induced electromagnetic field around each said coil, opposition between said fields in the region of said liquid sample being minimized by said spacing between said coils; switchgear for abruptly interrupting said electrical supply and collapsing said induced fields; said pick up and screening coils being of substantially the same turns area to ensure substantial cancellation of noise signals generated therein by said exterior electromagnetic impulses; and, a second said liquid sample located between said pick up coil and said screening coil for polarization by said induced electromagnetic field of said pick up coil combined with said induced electromagnetic field of said screening coil.

9. In a magnetometer head of the precessing atom portion type in which atomic portions in a liquid sample are polarized by an induced electromagnetic field which is thereafter abruptly terminated permitting said atomic portions to precess freely about the magnetic field to be assessed and the precession frequency measured to determine the field strength thereof, the combination of inductive pick up means including a pick-up coil located around said liquid sample for detecting electromagnetic impulses set up by said precession and converting them into an electrical signal; inductive screening means including a screening coil, extending around said pick-up coil encompassing the same along its length with the axes of both coils being coincident, connected to said pick-up coil in series bucking relation relative to exterior electromagnetic impulses originating independently of said precession, said screening coil being dimensioned to define a substantial cylindrical spacing between itself and said pick-up coil; means connecting said pick-up coil and said screening coil to a source of electrical supply establishing an induced electromagnetic field around each said coil, opposition between said fields in the region of said liquid sample being minimized by said spacing between said coils; switchgear for abruptly interrupting said electrical supply and collapsing said induced field; precession frequency measuring apparatus connectible to said pick-up means and said screening coil; switchgear operable to connect said measuring apparatus on the termination of said induced electromagnetic fields; said pick-up and screening coils being of substantially the same turns area to insure substantial cancellation of noise signals generated therein by said exterior electromagnetic impulses; a second said liquid sample located between said pick-up coil and said screening coil and means fastening said pick up coil and said screening coil in said spaced relation with said second sample therebetween.

10. A magnetometer sensing head of the precessing atom portion type in which the precession frequency of such portions is measured to assess the strength of the field under examination and comprising: at least one liquid sample embodying said atom portions; a container for said liquid sample; coil means extending around said container for inducting an electromagnetic field therein and polarizing said atom portions and for thereafter picking up electromagnetic impulses set up by said precession and convert the same into an electrical signal; means for connecting said coil to a source of electrical supply and for thereafter abruptly terminating the electromagnetic field induced thereby; inductive screening means associated with said coil for cancelling interference induced therein by electromagnetic impulses originating independently of said precession; and, a second liquid sample embodying further atom portions, and a second container for said second sample extending around said coil along its length and substantially encompassing the same, and wherein said screening means extends around the exterior of said second container.

11. A magnetometer sensing head of the precessing atom portion type in which the precession frequency of such portions is measured to assess the strength of the field under examination and comprising: at least one liquid sample embodying said atom portions; a container for said liquid sample; coil means extending around said container for inducing an electromagnetic field therein and polarizing said atom portions and for thereafter picking up electromagnetic impulses set up by said precession and convert the same into an electrical signal; means for connecting said coil to a source of electrical supply and for thereafter abruptly terminating the electromagnetic field induced thereby; an inductive screening coil associated with said coil for cancelling interference induced therein by electromagnetic impulses originating independently of said precession; a second liquid sample embodying further atom portions, and a second container for said second sample extending around said coil along its length and substantially encompassing the same, and wherein said screening means extends around the exterior of said second container; and, said pick-up and screening coils being of substantially the same turns area to ensure substantial cancellation of noise signals generated therein by said exterior electromagnetic impulses.

References Cited by the Examiner
UNITED STATES PATENTS

| | | | |
|---|---|---|---|
| 1,608,560 | 11/26 | Jones | 336—181 |
| Re. 23,769 | 1/54 | Varian | 324—0.5 |
| 2,856,579 | 10/58 | Packard | 324—0.5 |
| 3,004,211 | 10/61 | Anderson et al. | 324—0.5 |

FOREIGN PATENTS

| | | | |
|---|---|---|---|
| 1,218,456 | 12/59 | France | 324—0.5 |

OTHER REFERENCES

Waters: Journal of Scientific Instruments, vol. 35, March, 1958, pp. 83 to 93 incl.

CHESTER L. JUSTUS, *Primary Examiner.*

MAYNARD R. WILBUR, *Examiner.*